(12) United States Patent
Vasekin et al.

(10) Patent No.: US 11,416,252 B2
(45) Date of Patent: Aug. 16, 2022

(54) PROGRAM INSTRUCTION FUSION

(71) Applicant: Arm Limited, Cambridge (GB)

(72) Inventors: Vladimir Vasekin, Cambridge (GB); Chiloda Ashan Senarath Pathirane, Cambourne (GB); Jungsoo Kim, Sawston (GB); Alexei Fedorov, Cambridge (GB)

(73) Assignee: Arm Limited, Cambridge (GB)

( * ) Notice: Subject to any disclaimer, the term of this patent is extended or adjusted under 35 U.S.C. 154(b) by 312 days.

(21) Appl. No.: 15/855,139

(22) Filed: Dec. 27, 2017

(65) Prior Publication Data

US 2019/0196832 A1 Jun. 27, 2019

(51) Int. Cl.
*G06F 9/30* (2018.01)
*G06F 9/38* (2018.01)

(52) U.S. Cl.
CPC ........ *G06F 9/30196* (2013.01); *G06F 9/3802* (2013.01); *G06F 9/3867* (2013.01)

(58) Field of Classification Search
CPC ............. G06F 9/30149; G06F 9/30036; G06F 9/30189; G06F 9/30192; G06F 9/3861
See application file for complete search history.

(56) References Cited

U.S. PATENT DOCUMENTS

| | | | |
|---|---|---|---|
| 2004/0128483 A1* | 7/2004 | Grochowski | ......... G06F 9/3017 712/217 |
| 2010/0115248 A1* | 5/2010 | Ouziel | .................. G06F 9/3017 712/226 |
| 2017/0177343 A1* | 6/2017 | Lai | ...................... G06F 9/30181 |

* cited by examiner

*Primary Examiner* — Corey S Faherty
(74) *Attorney, Agent, or Firm* — Nixon & Vanderhye P.C.

(57) ABSTRACT

A data processing system includes an instruction pipeline containing instruction queue circuitry, fusion circuitry and decoder circuitry. The fusion circuitry serves to identify fusible groups of program instructions within a Y-wide window of program instructions and supply a stream of program instructions including such replacement fused program instructions to a X-wide decoder circuitry which decodes X program instructions in parallel using parallel decoders.

11 Claims, 5 Drawing Sheets

PROGRAM INSTRUCTION FUSION

BACKGROUND

Technical Field

This disclosure relates to the field of data processing systems. More particularly, this disclosure relates to the fusing of program instructions to form fused program instructions.

Technical Background

It is known to provide data processing systems with hardware which serves to fuse groups of program instructions to form fused program instructions. The fused program instructions and program instructions which are not able to be fused may then be executed. As a result of the presence of fewer instructions to be executed due to the replacement of multiple unfused instructions with fused instructions, such mechanisms can increase the speed and efficiency with which a program may execute.

SUMMARY

Viewed from aspect the present disclosure provides apparatus for processing data comprising:
  instruction queue circuitry to queue pre-fusion program instructions to be executed;
  fusion circuitry to receive said pre-fusion program instructions from said instruction queue circuitry and to identify and replace fusible groups within said pre-fusion program instructions with respective fused program instructions to form post-fusion program instructions; and
  decoder circuitry to receive said post-fusion program instructions from said fusion circuitry and to decode said post-fusion program instructions; wherein
  said decoder circuitry decodes in parallel up to X of said post-fusion program instructions, where X is an integer equal to or greater than one; and
  said fusion circuitry identifies said fusible groups within a window of Y pre-fusion program instructions, where Y is an integer greater than X.

Viewed from another aspect the present disclosure provides apparatus for processing data comprising:
  instruction queuing means for queuing pre-fusion program instructions to be executed;
  fusing means for receiving said pre-fusion program instructions from said instruction queuing means and for identifying and replacing fusible groups within said pre-fusion program instructions with respective fused program instructions to form post-fusion program instructions; and
  decoding means to receive said post-fusion program instructions from said fusing means and to decode said post-fusion program instructions; wherein
  said decoding means decodes in parallel up to X of said post-fusion program instructions, where X is an integer equal to or greater than one; and
  said fusing means identifies said fusible groups within a window of Y pre-fusion program instructions, where Y is an integer greater than X.

Viewed from another aspect the present disclosure provides a method of processing data comprising:
  queuing pre-fusion program instructions to be executed within instruction queue circuitry;
  using fusion circuitry to receive said pre-fusion program instructions from said instruction queue circuitry and to identify and replace fusible groups within said pre-fusion program instructions with respective fused program instructions to form post-fusion program instructions; and
  using decoder circuitry to receive said post-fusion program instructions from said fusion circuitry and to decode said post-fusion program instructions; wherein
  said decoder circuitry decodes in parallel up to X of said post-fusion program instructions, where X is an integer equal to or greater than one; and
  said fusion circuitry identifies said fusible groups within a window of Y pre-fusion program instructions, where Y is an integer greater than X.

Further aspects, features and advantages of the present technique will be apparent from the following description of examples, which is to be read in conjunction with the accompanying drawings.

DESCRIPTION OF EXAMPLES

Figure 1:
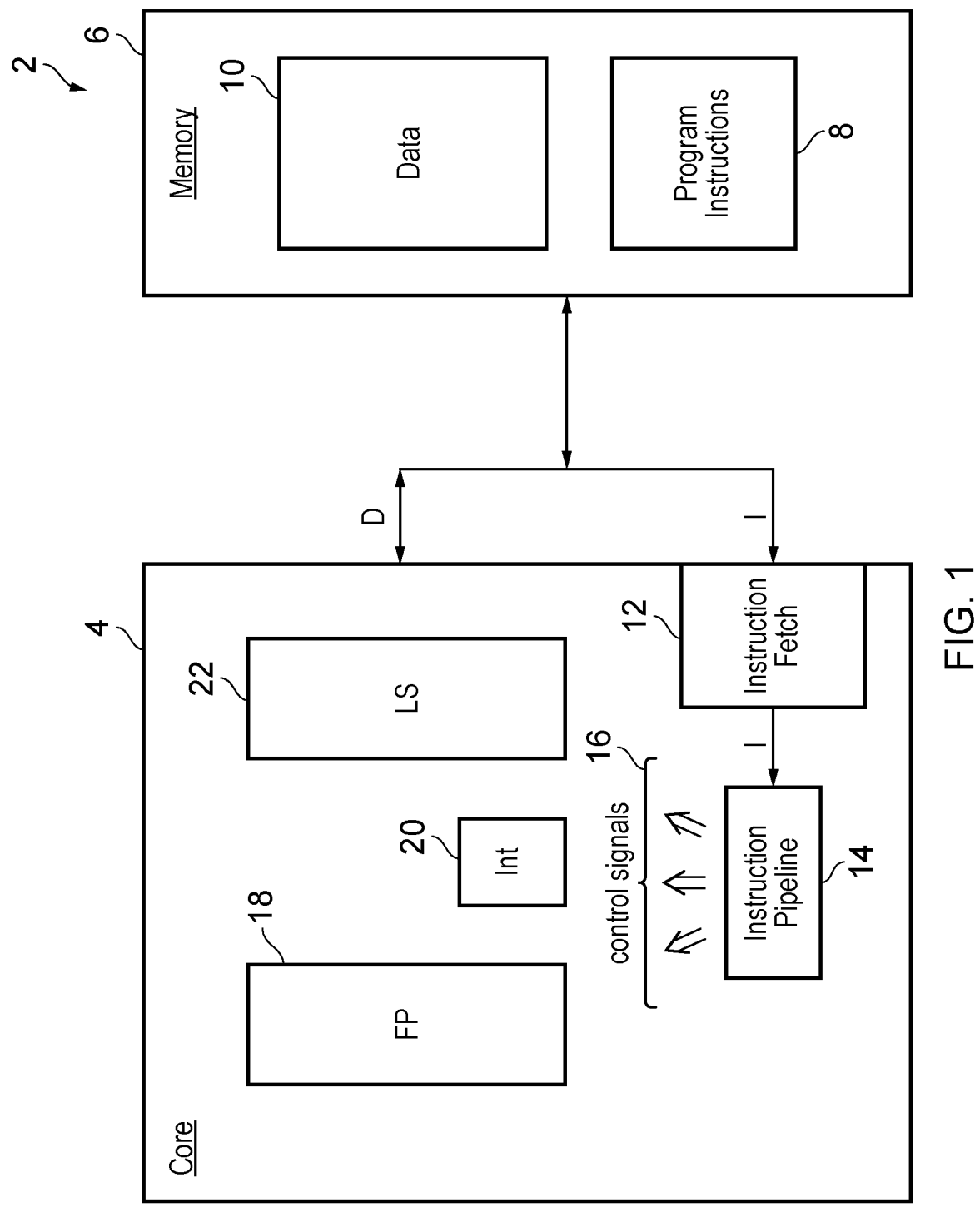
FIG. 1 schematically illustrates a data processing system including a processor core having instruction fetch circuitry and instruction pipeline circuitry.

FIG. 1 schematically illustrates a data processing system 2 comprising a processor core 4 coupled to a memory 6. The memory 6 stores program instructions 8 to be executed by the processor core 4 and data 10 to be manipulated by the program instructions executed by the processor core 4.

The processor core 4 includes instruction fetch circuitry 12 coupled to the memory 6 to fetch program instructions 8 to an instruction pipeline 14. The instruction pipeline 14 contains multiple pipeline stages such as an instruction queue stage, a fusion stage, a decoder stage, a reservation stage, etc. The number of pipeline stages within the instruction pipeline 14 may vary depending upon the particular form of the processor core 4.

The decoder stage or stages within the instruction pipeline 14 generate control signals 16 which serve to control execution pipelines 18, 20, 22 to perform processing operations, such as floating point operations, integer operations, and load store operations, as specified by the program instructions which are decoded for execution.

Figure 2:
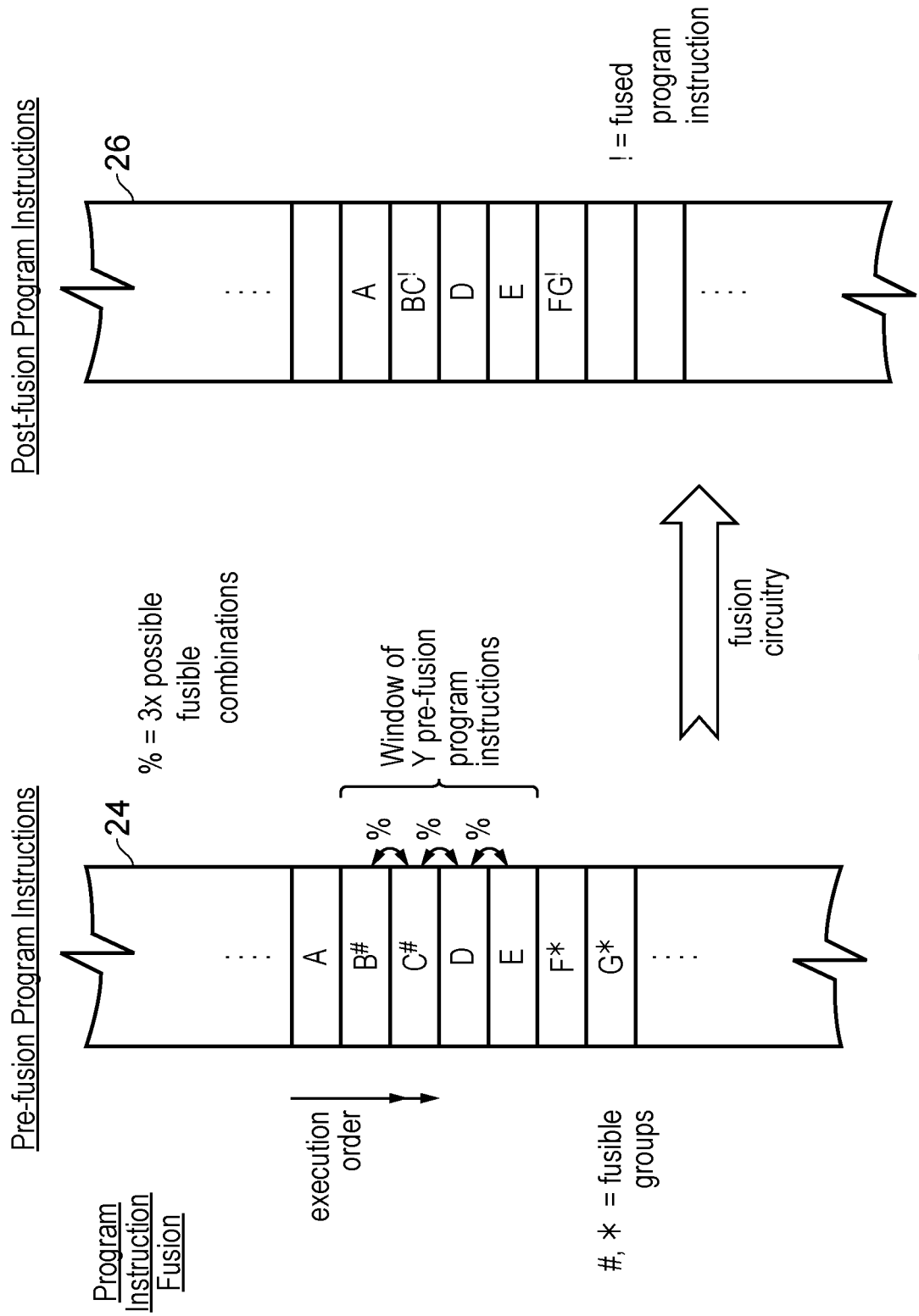
FIG. 2 schematically illustrates program instruction fusion.

FIG. 2 schematically illustrates program instruction fusion. In order to reduce the number of program instructions which are required to be executed, the instruction pipeline 14 includes fusion circuitry which serves to identify groups of program instructions capable of being fused to form fused program instructions which can then replace those groups of program instructions within the stream of program instructions. In this way, the number of program instructions which require execution may be reduced thereby increasing processing speed and reducing the energy consumed in performing the required processing operations.

FIG. 2 shows a stream of pre-fusion program instructions 24 which are instructions read from the memory 6 by the instruction fetch circuitry 12. These pre-fusion program instructions have an execution order as illustrated in FIG. 2. The instruction fetch circuitry 12 fetches these program instructions from the memory 6 as a stream of pre-fusion program instructions and these are then subject to identification and replacement operations comprising fusion processing by fusion circuitry within the instruction pipeline 14 to generate a corresponding stream of post-fusion program instructions 26. The fusion circuitry serves to examine pre-fusion program instructions within a window comprising Y (Y is an integer equal to or greater than 2) pre-fusion program instructions which have been fetched from the memory so as to identify groups of program instructions which can be replaced by a fused program instruction. In this example embodiment, the window of Y pre-fusion program instructions comprises four program instructions.

The identification of groups of program instructions capable of being fused in this example embodiment takes place by comparing adjacent program instructions within the execution order of the pre-fusion program instructions. In a window of four pre-fusion program instructions there are three possible fusible combinations of program instructions as indicated by the "%" symbol in FIG. 2. The fusion circuitry examines characteristics of the pre-fusion program instructions to identify pre-fusion program instructions capable of being fused. These characteristics may include characteristics such as the output operand of a first pre-fusion program instruction corresponds to the input operand of a second following and adjacent pre-fusion program instruction. For example, the first pre-fusion program instruction in this circumstance may be a multiplication instruction with the result of that multiplication instruction subsequently forming one input operand to an adjacent following addition instruction serving as the second pre-fusion program instruction. Such a multiplication program instruction followed by an addition program instruction may be replaced by a single multiply-accumulate program instruction which can perform the desired multiplication and addition by execution of that single multiply-accumulate program instruction.

As illustrated in FIG. 2, the fusion circuitry identifies a group of fusible program instructions comprising pre-fusion program instructions A and C and a further group of fusible pre-fusion program instructions comprising pre-fusion program instructions F and G. Accordingly, within the post-fusion program instructions 26 the fusion circuitry replaces pre-fusion program instructions B and C with a corresponding single post-fusion program instruction BC. Similarly, the pre-fusion program instructions F and G are replaced by a single post-fusion program instruction FG.

In the example illustrated in FIG. 2, the window of pre-fusion program instructions within which fusible groups are identified and replaced comprises Y pre-fusion program instructions, which in this example is 4 pre-fusion program instructions. It will be appreciated that such a Y-wide window for fusible group identification allows three adjacent pairs of program instructions to be examined to determine if they may be fused. However, pre-fusion program instruction A and pre-fusion program instruction B fall within different windows which are examined within the fusion circuitry to identify fusible groups and accordingly even if pre-fusion program instruction A and pre-fusion program instruction B were capable of being fused, they will not be identified as such. For this reason, more fusible groups within the pre-fusion program instructions 24 will be identified when a wider window of pre-fusion program instructions are examined. The separate provision of fusion circuitry to perform fusible group identification and replacement between instruction queue circuitry and decoder circuitry enables a wider window of pre-fusion program instructions to be examined for fusible groups without compromising the timing of the operation of the instruction queue circuitry and without requiring an unnecessarily wide decoder circuitry for decoding a large number of program instructions in parallel.

Figure 3:
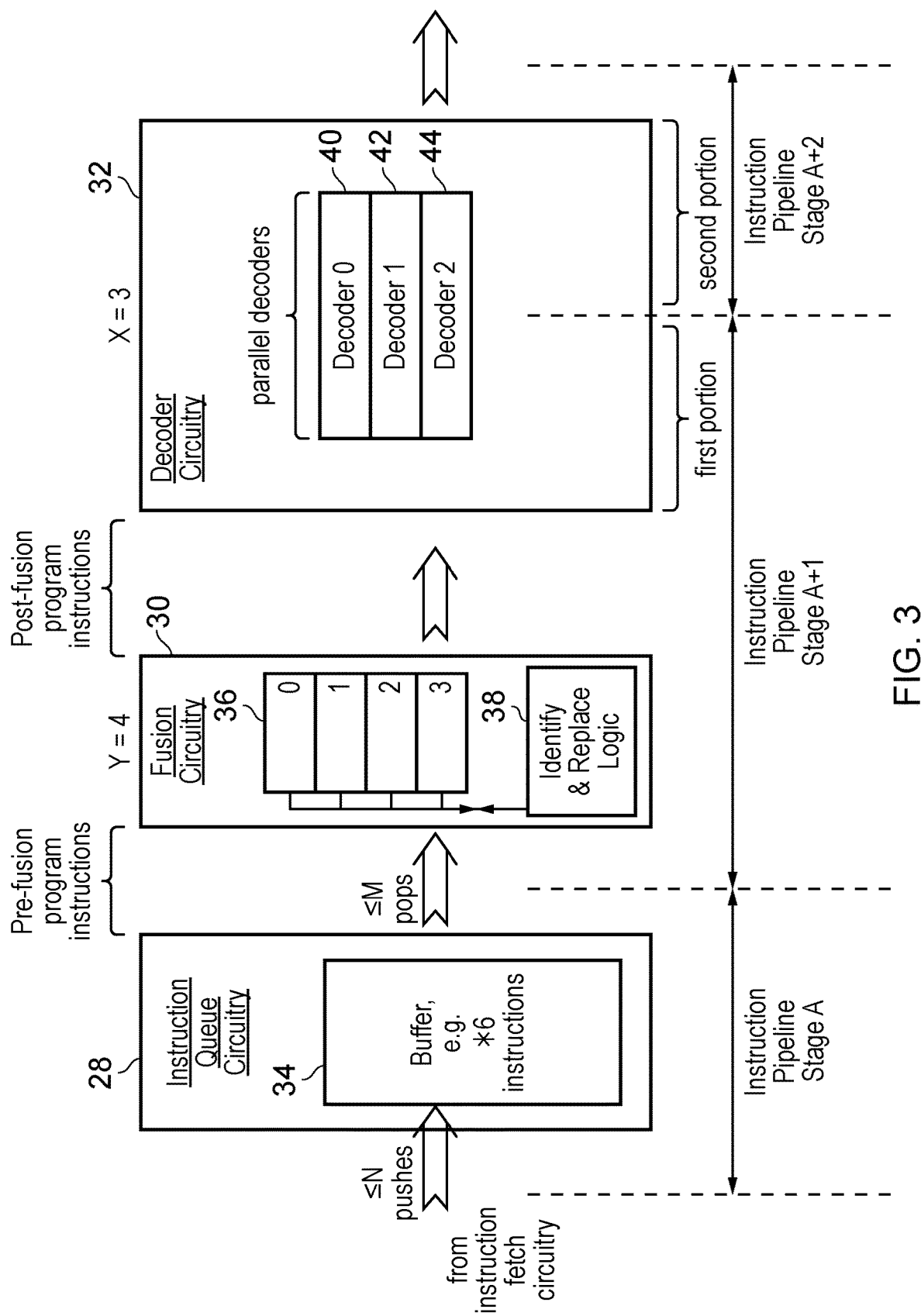
FIG. 3 schematically illustrates a portion of instruction pipeline circuitry including instruction queue circuitry, fusion circuitry and decoder circuitry.

FIG. 3 schematically illustrates a portion of the instruction pipeline 14 comprising instruction queue circuitry 28, fusion circuitry 30 and decoder circuitry 32. The instruction queue circuitry 28 includes a buffer 34 into which pre-fusion program instructions fetched by the instruction fetch circuitry 12 are stored. In this example, the buffer 34 stores six pre-fusion program instructions. The buffer 34 may employ a header pointer and a footer pointer to indicate a read location and a write location within the buffer 34 from which pre-fusion program instructions are to be read and to which pre-fusion program instructions are to be rewritten in pop/push operations. Whilst the use of such a buffer 34 with pointers to a header and footer location, together with appropriate multiplexers for routing read or written pre-fusion program instructions from and to the buffer 34, provides energy efficient operation, it may also introduce a timing bottleneck within the system as a whole making it difficult to accommodate the identification and replacement of fusible groups of program instructions within the pipeline stage A corresponding to the instruction queue circuitry 28.

Fusion circuitry 30 serves to receive pre-fusion program instructions from the instruction queue circuitry 28 and store these within registers 36 corresponding to a Y-wide window within which fusible groups of pre-fusion program instructions are identified and replaced. Identify and replace logic 38 coupled to the registers 36 serves to identify characteristics of the pre-fusion program instructions stored within the register 36 which indicate that a group of pre-fusion program instructions are capable of being fused and replaced by a post-fusion program instruction and then to perform such a replacement. The post-fusion program instructions read from the fusion circuitry 30 and supplied to the decoder circuitry 32 comprise the post-fusion program instructions and contain a mix of the original pre-fusion program instructions (which were not suitable for fusion) with fused program instructions which have been formed by the fusion circuitry 30 and serve to replace a fusible group of the pre-fusion program instructions. The post-fusion program instructions from the fusion circuitry 30 are supplied to the decoder circuitry 32 where a number of decoders 40, 42, 44, serve to decode in parallel the program instructions of the post-fusion program instruction stream. The decoder circuitry contains X parallel decoders 40, 42, 44 (where X is equal to or greater than one; if X=1, then there is a single decoder rather than parallel decoders). In the example illustrated in FIG. 3, X=3 corresponding to three parallel decoders 40, 42, 44.

In the example embodiment of FIG. 3 the decoder circuitry 32 comprises a first portion which forms part of instruction pipeline stage A+1 together with the fusion circuitry 30 and a second portion which forms the instruction pipeline stage A+2. The decoder circuitry 32 in the example embodiment of FIG. 3 is sufficiently complex that its operations cannot be performed within a single clock cycle and accordingly cannot be accommodated within a single instruction pipeline stage. However, when split over two processing clock cycles, the processing operations performed by the decoder circuitry 32 leave sufficient time that the fusion operations performed by the fusion circuitry 30 may be performed within the same clock cycle as a first portion of the decoder circuitry 32 requires to perform its operations. Accordingly, the fusion circuitry 30 and the first portion of the decoder circuitry 32 together form an instruction pipeline stage A+1 within the instruction pipeline 14. It will be appreciated that in other example embodiments the fusion circuitry 30 may have its own dedicated instruction pipeline stage, such as, for example, if the fusion circuitry 30 was to perform a more extensive search for fusible groups of program instructions within a wider window of pre-fusion program instructions.

Figure 4:
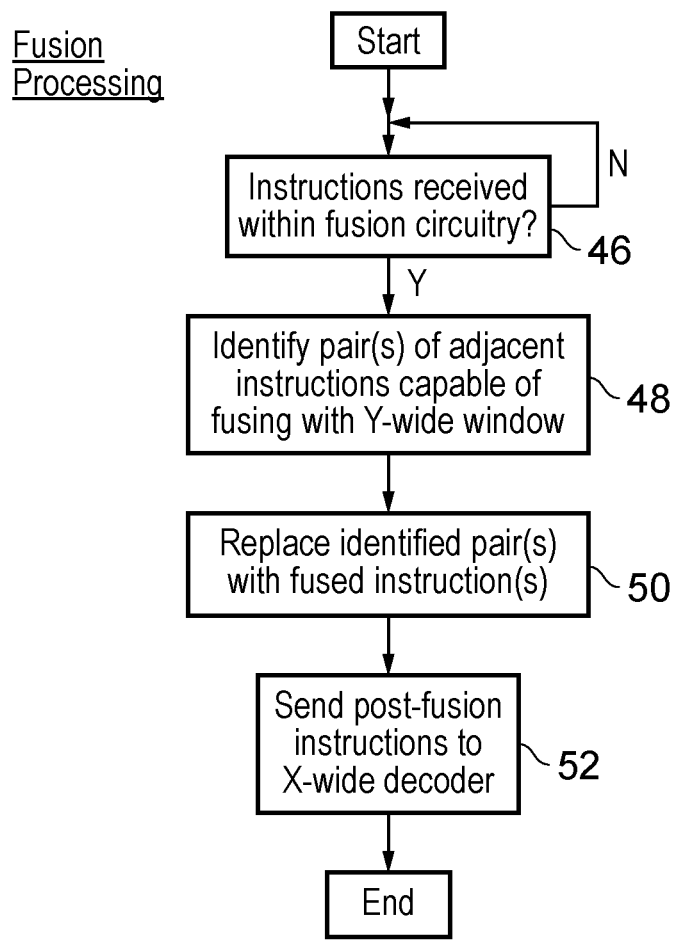
FIG. 4 is a flow diagram schematically illustrating fusion processing.

FIG. 4 is a flow diagram schematically illustrating fusion processing. At step 46 processing waits until a Y-wide window of pre-fusion program instructions are received within the fusion circuitry 30 for fusion processing circuitry. When such instructions have been received, step 48 serves to identify pairs of adjacent instructions capable of fusing within the Y-wide window of pre-fusion program instructions which are stored within the fusion circuitry 30. Step 50 replaces any identified pair of fusible pre-fusion program instructions with a corresponding fused program instruction. As previously mentioned, examples of fusible program instructions may include a multiplication instruction followed by an addition instruction which may be fused into a multiply-accumulate instruction. Another example of a fusible pair of instructions may comprise a compare instruction followed by a branch instruction which may be replaced by an appropriate conditional branch instruction.

After the fusible pairs of instructions have been replaced by fused instructions, then the post-fusion program instructions including the replacement fused instructions are sent to the X-wide decoder circuitry 32. The provision of the fusion circuitry 30 between the instruction queue circuitry 28 and the decoder circuitry 32 enables a wider window, namely a Y-wide window, to be employed for identifying fusible groups of program instructions compared to the X-wide window of program instructions which are decoded in parallel by the decoder circuitry 32. The use of the Y-wide window within the fusion circuitry 30, where Y>X, permits more fusible groups of program instructions to be identified than if an X-wide window were used for the identification of such fusible groups. Step 52 sends the post-fusion program instructions to the decoder circuitry 32 from the fusion circuitry 30.

Figure 5:
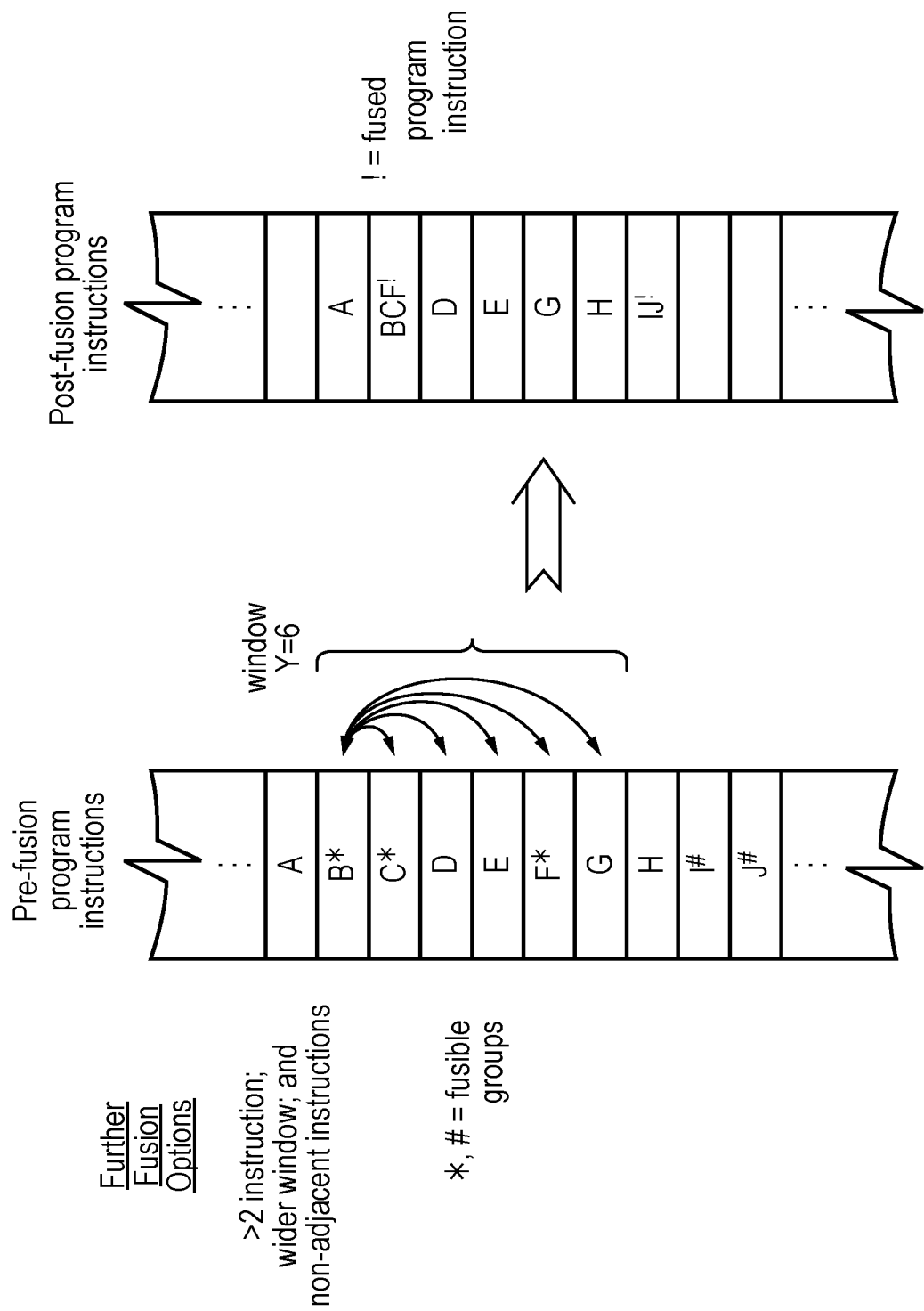
FIG. 5 schematically illustrates further program fusion options which may be provided in different embodiments.

FIG. 5 schematically illustrates further fusion options which may be employed in other example embodiments. In this example embodiment, the window within which fusible groups is identified is six program instructions wide, namely Y=6. Furthermore, in this example embodiment, a given program instruction, such as program instruction B within the pre-fusion program instructions, is compared not only with the adjacent instructions within the window, but also with non-adjacent instructions within that window. In some circumstances, it may be possible to fuse a pre-fusion program instruction B with a non-adjacent program instruction, such as program instruction F. Also illustrated in FIG. 5 is the possibility that more than two pre-fusion program instructions may be fused together to form a fused program instruction. More particularly, in the example illustrated, the pre-fusion program instructions B, C and F are fused to form a fused program instruction BCF.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
   instruction queue circuitry to queue pre-fusion program instructions to be executed;
   fusion circuitry to receive said pre-fusion program instructions from said instruction queue circuitry and to identify and replace fusible groups within said pre-fusion program instructions with respective fused program instructions to form post-fusion program instructions; and
   decoder circuitry to receive said post-fusion program instructions from said fusion circuitry and to decode said post-fusion program instructions; wherein
   said decoder circuitry is configured to decode in parallel up to X of said post-fusion program instructions, where X is an integer greater than one; and
   said fusion circuitry is configured to wait until a window of Y pre-fusion program instructions is received and, in response to receiving the window of Y pre-fusion program instructions, to identify said fusible groups within the window of Y pre-fusion program instructions, where Y is a predetermined integer greater than X.

2. Apparatus as claimed in claim 1, wherein said window of Y pre-fusion program instructions comprises Y adjacent program instructions within an ordered stream of program instructions to be executed.

3. Apparatus as claimed in claim 1, wherein said instruction queue circuitry, said fusion circuitry and said decoder circuitry comprise respective portions of instruction processing pipeline circuitry.

4. Apparatus as claimed in claim 1, wherein said fusion circuitry and a first portion of said decoder circuitry comprise a pipeline stage of said instruction processing pipeline circuitry.

5. Apparatus as claimed in claim 3, wherein said instruction queue circuitry comprises a buffer to store a plurality of said pre-fusion program instructions and to receive one or more pre-fusion program instruction from instruction prefetch circuitry and to output one or more pre-fusion program instructions to said fusion circuitry within a single clock cycle of said instruction processing pipeline circuitry.

6. Apparatus as claimed in claim 1, wherein said fusion circuitry identifies a fusible group using one or more characteristics of said pre-fusion program instructions, said one or more characteristics comprises that a first pre-fusion program instruction within said fusible group has an output operand that serves as an input operand to a second pre-fusion program instruction within said fusible group.

7. Apparatus as claimed in claim 1, wherein said fusible groups comprise two adjacent pre-fusion program instructions within a stream of pre-fusion program instructions.

8. Apparatus as claimed in claim 1, wherein Y=X+1.

9. Apparatus as claimed in claim 1, wherein X=3.

10. Apparatus for processing data comprising:
    means for queuing pre-fusion program instructions to be executed;
    means for receiving said pre-fusion program instructions from said means for queuing pre-fusion program instructions and for identifying and replacing fusible groups within said pre-fusion program instructions with respective fused program instructions to form post-fusion program instructions; and
    means to receive said post-fusion program instructions from said means for receiving said pre-fusion program instructions and to decode said post-fusion program instructions; wherein said means for receiving said post-fusion program instructions is configured to decode in parallel up to X of said post-fusion program instructions, where X is an integer greater than one; and said means for receiving said pre-fusion program instructions is configured to wait until a window of Y pre-fusion program instructions is received and, in response to receiving the window of Y pre-fusion program instructions, to identify said fusible groups within the window of Y pre-fusion program instructions, where Y is a predetermined integer greater than X.

11. A method of processing data comprising:

queuing pre-fusion program instructions to be executed within instruction queue circuitry;

using fusion circuitry to receive said pre-fusion program instructions from said instruction queue circuitry and to identify and replace fusible groups within said pre-fusion program instructions with respective fused program instructions to form post-fusion program instructions; and using decoder circuitry to receive said post-fusion program instructions from said fusion circuitry and to decode said post-fusion program instructions; wherein said decoder circuitry decodes in parallel up to X of said post-fusion program instructions, where X is an integer greater than one; and said fusion circuitry waits until a window of Y pre-fusion program instructions is received and, in response to receiving the window of Y pre-fusion program instructions, identifies said fusible groups within the window of Y pre-fusion program instructions, where Y is a predetermined integer greater than X.

* * * * *